United States Patent
Strebelle et al.

(10) Patent No.: US 9,164,193 B2
(45) Date of Patent: Oct. 20, 2015

(54) SYSTEM AND METHOD FOR OPTIMIZING THE NUMBER OF CONDITIONING DATA IN MULTIPLE POINT STATISTICS SIMULATION

(75) Inventors: Sebastien Bruno Strebelle, San Francisco, CA (US); Claude Edward Cavelius, San Francisco, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 630 days.

(21) Appl. No.: 13/493,062

(22) Filed: Jun. 11, 2012

(65) Prior Publication Data

US 2013/0329986 A1 Dec. 12, 2013

(51) Int. Cl.
- *G06K 9/62* (2006.01)
- *G01V 99/00* (2009.01)

(52) U.S. Cl.
CPC .................................. *G01V 99/005* (2013.01)

(58) Field of Classification Search
None
See application file for complete search history.

(56) References Cited

U.S. PATENT DOCUMENTS

| | | | |
|---|---|---|---|
| 6,839,632 B2 | 1/2005 | Grace | |
| 7,079,953 B2 | 7/2006 | Thorne et al. | |
| 7,298,891 B2 | 11/2007 | McDowall et al. | |
| 7,516,055 B2 | 4/2009 | Strebelle | |
| 7,558,708 B2 | 7/2009 | Ravalec-Dupin et al. | |
| 7,630,517 B2 | 12/2009 | Mirowski et al. | |
| 7,765,091 B2 | 7/2010 | Lee et al. | |
| 7,970,593 B2 | 6/2011 | Roggero et al. | |
| 7,996,198 B2 | 8/2011 | Swanson et al. | |
| 8,117,019 B2 | 2/2012 | Sun et al. | |
| 2006/0041409 A1 | 2/2006 | Strebelle et al. | |
| 2006/0041410 A1* | 2/2006 | Strebelle ........................ | 703/10 |
| 2008/0234988 A1 | 9/2008 | Chen et al. | |
| 2009/0164182 A1 | 6/2009 | Pedersen et al. | |
| 2009/0259446 A1 | 10/2009 | Zhang et al. | |
| 2010/0198570 A1 | 8/2010 | Sarma et al. | |
| 2010/0299126 A1 | 11/2010 | Chugunov et al. | |
| 2010/0332205 A1 | 12/2010 | Tiller et al. | |
| 2011/0004447 A1 | 1/2011 | Hurley et al. | |

(Continued)

FOREIGN PATENT DOCUMENTS

WO    WO 2009/138290    11/2009

OTHER PUBLICATIONS

Using the Snesim . . . simulation, Yuhong Liu, Elsevier, 2006, pp. 1544-1563.*

(Continued)

*Primary Examiner* — Jayesh A Patel
(74) *Attorney, Agent, or Firm* — Albert K. Shung (57) ABSTRACT

A computer system and a computer-implemented method for optimizing the number of conditioning data used in multiple point statistics simulation. The method includes inputting a training image representative of subsurface geological heterogeneity; and inputting an initial conservative number of conditioning data. The method further includes selecting a geometry of a template wherein a size of the template is defined by the conservative number of conditioning data; building a search tree using the template by scanning the training image with the template and storing data patterns present in the training image in the search tree to obtain a plurality of patterns; and determining a threshold number of conditioning data smaller than the initial conservative number of conditioning data beyond which estimated facies probabilities are not significantly modified by additional number of conditioning data.

16 Claims, 9 Drawing Sheets

(56) References Cited

U.S. PATENT DOCUMENTS

| | | |
|---|---|---|
| 2011/0004448 A1 | 1/2011 | Hurley et al. |
| 2011/0213600 A1 | 9/2011 | Strebelle |
| 2011/0231164 A1 | 9/2011 | Zhang et al. |
| 2011/0231170 A1 | 9/2011 | Biver et al. |
| 2011/0251833 A1 | 10/2011 | Mariethoz et al. |

OTHER PUBLICATIONS

Honarkhah, Mehrdad, et al; "Stochastic Simulation of Patterns Using Distance-Based Pattern Modeling"; Math Geosci., 2010, vol. 42, pp. 487-517; XP019825820A.

Liu, Yuhong; "Using the Snesim Program for Multiple-Point Statistical Simulation"; Computers & Geosciences, 2006, vol. 32, pp. 1544-1563; XP027942983A.

* cited by examiner

| Number of cond. Data | P(T1) | P(T2) | P(T3) | P(T4) | P(T5) | P(T6) | P(T7) | P(T8) | P(T9) |
|---|---|---|---|---|---|---|---|---|---|
| 0 | 0.648224 | 0.648224 | 0.648224 | 0.648224 | 0.648224 | 0.648224 | 0.648224 | 0.648224 | 0.648224 |
| 1 | 0.889882 | 0.889882 | 0.889882 | 0.889882 | 0.889882 | 0.889882 | 0.889882 | 0.889882 | 0.889882 |
| 2 | 0.474539 | 0.474539 | 0.474539 | 0.474539 | 0.474539 | 0.474539 | 0.474539 | 0.474539 | 0.474539 |
| 3 | 0.586544 | 0.586544 | 0.586544 | 0.586544 | 0.586544 | 0.586544 | 0.586544 | 0.586544 | 0.586544 |
| 4 | 0.491982 | 0.491982 | 0.491982 | 0.491982 | 0.491982 | 0.491982 | 0.491982 | 0.491982 | 0.491982 |
| 5 | 0.320105 | 0.320105 | 0.320105 | 0.320105 | 0.320105 | 0.320105 | 0.320105 | 0.320105 | 0.320105 |
| 6 | 0.31158 | 0.31158 | 0.31158 | 0.31158 | 0.31158 | 0.31158 | 0.31158 | 0.31158 | 0.31158 |
| 7 | 0.497547 | 0.497547 | 0.497547 | 0.497547 | 0.497547 | 0.497547 | 0.497547 | 0.497547 | 0.497547 |
| 8 | 0.497547 | 0.497547 | 0.497547 | 0.497547 | 0.497547 | 0.497547 | 0.497547 | 0.497547 | 0.497547 |
| 9 | 0.375318 | 0.375318 | 0.375318 | 0.375318 | 0.375318 | 0.375318 | 0.375318 | 0.375318 | 0.375318 |
| 10 | 0.384962 | 0.384962 | 0.384962 | 0.384962 | 0.384962 | 0.384962 | 0.384962 | 0.384962 | 0.384962 |
| 11 | 0.383686 | 0.383686 | 0.383686 | 0.383686 | 0.383686 | 0.383686 | 0.383686 | 0.383686 | 0.383686 |
| 12 | 0.383686 | 0.383686 | 0.383686 | 0.383686 | 0.383686 | 0.383686 | 0.383686 | 0.383686 | 0.383686 |
| 13 | 0.383686 | 0.383686 | 0.383686 | 0.383686 | 0.383686 | 0.383686 | 0.383686 | 0.383686 | 0.383686 |
| 14 | 0.383686 | 0.383686 | 0.383686 | 0.383686 | 0.383686 | 0.383686 | 0.383686 | 0.383686 | 0.383686 |
| 15 | 0.381933 | 0.381933 | 0.381933 | 0.381933 | 0.381933 | 0.381933 | 0.381933 | 0.381933 | 0.381933 |
| 16 | 0.239875 | 0.239875 | 0.239875 | 0.239875 | 0.239875 | 0.239875 | 0.239875 | 0.239875 | 0.239875 |
| 17 | 0.239875 | 0.239875 | 0.239875 | 0.239875 | 0.239875 | 0.239875 | 0.239875 | 0.239875 | 0.239875 |

FIG. 4A

| | | | | | | |
|---|---|---|---|---|---|---|
| 18 | 0.242038 | 0.242038 | 0.242038 | 0.242038 | 0.242038 | 0.242038 |
| 19 | 0.207143 | 0.207143 | 0.207143 | 0.207143 | 0.207143 | 0.207143 |
| 20 | 0.207143 | 0.207143 | 0.207143 | 0.207143 | 0.207143 | 0.207143 |
| 21 | 0.202899 | 0.202899 | 0.202899 | 0.202899 | 0.202899 | 0.202899 |
| 22 | 0.190476 | 0.190476 | 0.190476 | 0.190476 | 0.190476 | 0.190476 |
| 23 | 0.220779 | 0.220779 | 0.220779 | 0.220779 | 0.220779 | 0.220779 |
| 24 | 0.223684 | 0.223684 | 0.223684 | 0.223684 | 0.223684 | 0.223684 |
| 25 | 0.157895 | 0.157895 | 0.157895 | 0.157895 | 0.157895 | 0.421053 |
| 26 | 0.113208 | 0.113208 | 0.113208 | 0.113208 | | 0.421053 |
| 27 | 0.113208 | 0.113208 | 0.113208 | 0.113208 | | |
| 28 | 0.181818 | 0.064516 | 0.064516 | 0.064516 | | 0.5 |
| 29 | 0.181818 | 0.064516 | 0.064516 | 0.064516 | | 0.5 |
| 30 | 0.181818 | 0.064516 | 0.064516 | 0.064516 | | 0.5 |
| 31 | 0.181818 | 0.064516 | 0.064516 | 0.064516 | | 0.5 |
| 32 | 0.181818 | 0.064516 | 0.064516 | 0.064516 | | 0.5 |
| 33 | | 0.076923 | 0.076923 | 0.076923 | | |
| 34 | | 0.076923 | 0.076923 | 0.076923 | | |
| 35 | | 0.076923 | 0.076923 | 0.076923 | | |
| 36 | | 0.083333 | 0.083333 | | | |
| 37 | | 0.083333 | 0.083333 | | | |
| 38 | | 0.083333 | 0.083333 | | | |
| 39 | | 0.083333 | 0.083333 | | | |
| 40 | | 0.083333 | 0.083333 | | | |
| 41 | | 0.052632 | | | | |
| 42 | | 0.052632 | | | | |
| 43 | | 0.052632 | | | | |
| 44 | | 0.052632 | | | | |

SYSTEM AND METHOD FOR OPTIMIZING THE NUMBER OF CONDITIONING DATA IN MULTIPLE POINT STATISTICS SIMULATION

FIELD

The present invention pertains in general to computation methods and more particularly to a computer system and computer-implemented method for optimizing the number of conditioning data used in multiple point statistics simulation.

BACKGROUND

In the characterization of oil fields in the petroleum industry, 3D modeling using geostatistics is often used to assess reservoir heterogeneity and connectivity. Geostatistics often uses kriging to interpolate between data points or conditioning data. Conditioning data includes well log hard data, but can also include soft data, typically seismic data.

Conventional 3D modeling methods are based on variogram or two-point-statistics. Variogram-based algorithms allow integrating well and seismic data using a pixel-based approach. First, well data are blocked to the reservoir stratigraphic grid, i.e. well data values are assigned to the cells that the wells penetrate and sample. Then, all unsampled cells in the reservoir stratigraphic grid are simulated conditional to well and seismic data using some form of kriging. However, the models built using conventional variogram-based methods are most often not consistent with geological interpretation. Variogram-based geostatistics is inadequate in integrating geological concepts: two-point statistics variograms do not allow modeling complex geological heterogeneity. As a result, the variogram-based methods usually generate models that provide poor reservoir performance forecasting.

Over the past 10 years, the traditional variogram-based methods have been replaced by Multiple Point Statistics (MPS) methods. The MPS approach replaces traditional variograms with 3D numerical conceptual models of the subsurface geology, also known as training images.

MPS simulation is a reservoir facies modeling technique that uses conceptual geological models as 3D training images (or training cubes) to generate geologically realistic reservoir models. The training images provide a conceptual description of the subsurface geological geobodies, based on well log interpretation and general experience in reservoir architecture modeling. MPS simulation extracts multiple-point patterns from the training image and anchors the patterns to reservoir well data.

A 3D data template is provided by a user to define the dimensions of the multi-point patterns to be reproduced from the training image. Specifically, a size of the 3D data template corresponds to the maximum number of conditioning data used to infer statistics from the training image during the MPS simulation process. The larger the template (i.e., the larger the number of conditioning data), the better the reproduction of the geological features displayed by the training image. However, because computation time of MPS simulation increases exponentially with the size of the template, a trade-off is made between simulation computation time and training pattern reproduction quality. The trade-off is a function of the number of facies to model and the complexity of the training image.

One conventional approach to optimize the template size, i.e. the number of conditioning data used in MPS simulation, for a given training image is by trial-and-error where multiple MPS simulations are run using various template sizes, and the smallest template size that allows reasonable training image reproduction is retained. However, this conventional approach is extremely computation time-intensive (i.e., CPU time-intensive) and seldom used. Instead, common conventional methods consist of setting, by the experienced modeler, the template size (i.e., the maximum number of conditioning data) to an arbitrary number that is conservative and high enough to ensure reasonable pattern reproduction, even with complex multi-facies training images. For example, in some cases, the default template size is set to 40 cells. In this case, pattern reproduction is, in most cases, satisfactory. However, one drawback is that the simulation can take up to several hours (in some instances tens of hours).

Therefore, there is a need for a method for optimizing conditioning data templates that cures these and other deficiencies in the conventional methods so as to find an optimal template size, or optimal number of conditioning data, that would minimize computation time of an MPS simulation while preserving training pattern reproduction quality.

SUMMARY

An aspect of the present invention is to provide a computer-implemented method for optimizing a number of conditioning data used in multiple point statistics simulation. The method includes inputting, into the computer, a training image representative of subsurface geological heterogeneity; inputting, into the computer, an initial conservative number of conditioning data; selecting, by the computer, a geometry of a template wherein a size of the template is defined by the initial conservative number of conditioning data; building, using the computer, a search tree using the template by scanning the training image with the template and storing data patterns present in the training image in the search tree to obtain a plurality of patterns; and determining, by the computer, a threshold number of conditioning data, smaller than the initial conservative number of conditioning data, beyond which estimated facies probabilities are not significantly modified by additional conditioning data.

Another aspect of the present invention is to provide a system for optimizing conditioning data templates in multiple point statistics simulation. The system includes a computer readable memory configured to store input data comprising a training image representative of subsurface geological heterogeneity; and an initial conservative number of conditioning data. The system further includes a computer processor in communication with the computer readable memory, the computer processor being configured to read the input data; select a geometry of a template wherein a size of the template is defined by the initial conservative number of conditioning data; build a search tree using the template by scanning the training image with the template and store data patterns present in the training image in the search tree to obtain a plurality of patterns; and determine a threshold number of conditioning data, smaller than the initial conservative number of conditioning data, beyond which estimated facies probabilities are not significantly modified by additional conditioning data.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 4A is the first half of an example of a pattern table listing various probabilities of finding a facies (e.g., shale) when using various patterns T1, T2, T3, ..., T9 as a function of a number of conditioning data used, according to an embodiment of the present invention;

FIG. 4B is the second half of an example of a pattern table listing various probabilities of finding a facies (e.g., shale) when using various patterns T1, T2, T3, ..., T9 as a function of a number of conditioning data used, according to an embodiment of the present invention;

DETAILED DESCRIPTION

In one embodiment, MPS simulation includes inferring at each cell of the reservoir geological grid the local facies probabilities (i.e. the probability that each facies exists at the cell location) given the conditioning data closest to the cell. Because MPS simulation is a sequential simulation method, i.e., all unsampled cells from the reservoir stratigraphic grid are visited and simulated along a random path, the conditioning data includes original well log data blocked to the geological grid, and previously simulated cells.

Figure 1:
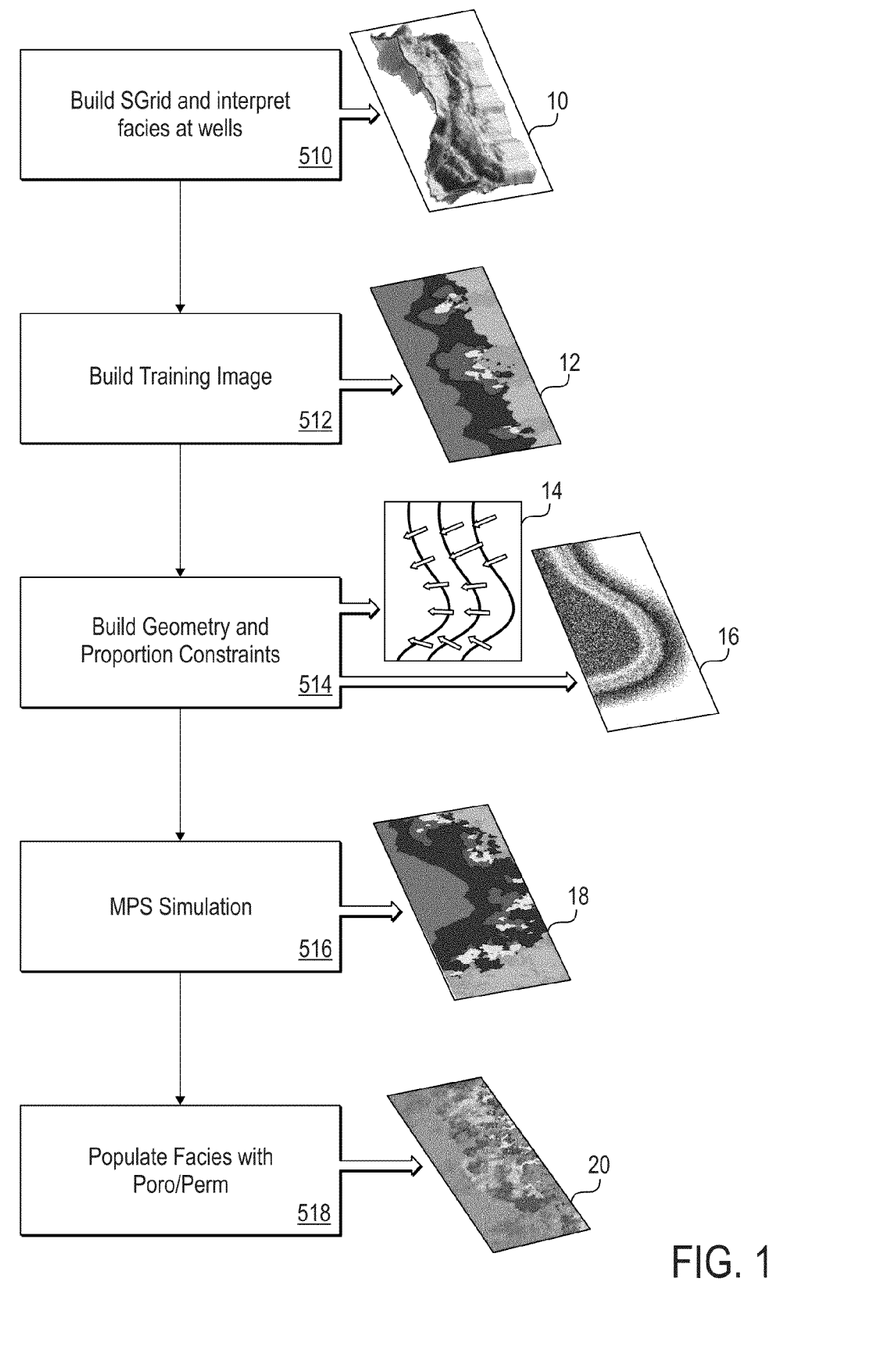
FIG. 1 depicts a workflow diagram of a Multiple Point Statistics (MPS) reservoir modeling method, according to an embodiment of the present invention.

FIG. 1 depicts a workflow diagram of a MPS reservoir modeling method, according to an embodiment of the present invention. The method includes building a grid in a desired geological region 10 and interpreting facies at specific cells within the grid, at S10. The method further includes building a training image 12, at S12. Although the training image 12 is shown as being in two-dimension, the training image is in fact a 3D training image or training cube. In one embodiment, the training image 12 can be built as a collection of facies patterns that contain no absolute or relative spatial information, i.e., the training image is not conditioned to well data. Training images can be generated, for example, using information from aerial photography, pictures of outcrops, hand-drawn sketches, etc. The most conventional method to build training images consists in generating unconditional object-based models. First, dimensions, shapes, and orientations of each facies are described and then associations among various facies (sand, shale, clay, etc.) are specified. Next, geometry constraints (such as azimuth angle, object size, etc.) 14 and proportion constraints (i.e., facies proportion map or facies proportion curves) 16 of the various facies within the training images can be specified, at S14.

The MPS modeling method further includes performing an MPS simulation, at S16 to obtain a simulated image 18 showing the facies model. MPS simulation infers at each cell of the reservoir geological grid the local facies probabilities (i.e. the probability that each facies exists at the cell location) given the conditioning data closest to the cell, and then drawing a facies value from these probabilities using a Monte-Carlo method. The local facies probabilities are inferred by looking in the training image for all the patterns that match the conditioning data. The method may further include populating the facies model with porosity and/or permeability parameters, at S18 to obtain an image 20 representation of the relative porosity and/or permeability.

The computation of local facies probabilities includes counting how many times patterns similar to the conditioning data, i.e., patterns that have the same geometrical configuration and same data values as the conditioning data, can be found in the training image. In another embodiment, instead of repeatedly scanning the training image for each cell to be simulated, all the patterns present in the training image are stored, prior to the simulation, in a dynamic data structure table called search tree. Only patterns that actually occur over the training image are stored in the search tree. A data template is defined to limit the geometric extent of these patterns. The size of this data template corresponds to the maximum number of conditioning data that will be used to simulate each unsampled cells. The search tree is stored in a storage device or memory. The search tree is organized to allow a relatively fast retrieval of any particular pattern, thus a relatively fast computation of facies probabilities given any particular conditioning pattern. The search tree is built by scanning only once the training image with the data template and storing data patterns present in the training image in the search tree to form a plurality of patterns in the pattern table. The larger the data template (i.e., the larger the maximum number of conditioning data used to simulate each unsampled cell), the larger is the pattern table or search tree and the more time it takes to retrieve facies probabilities from the pattern table. For example, if the modeler wants to use a maximum number of 40 conditioning data, then the pattern table is generated with a data template consisting of 40 cells. If, for instance, each cell can be sand or shale, the maximum number of permutation patterns that correspond to the data template, and that can occur in the training image, is about $2^{40}$ (about $10^{12}$), which is considerably large. If the number of conditioning data is reduced to less than 40, for example 20, then the maximum number of permutation patterns that could be found in the training image is reduced to $2^{20}$ (about $10^6$), which results in saving memory space and ultimately in reducing the computation time for retrieving the probabilities within the pattern table. If the number of conditioning data is reduced to a very low level such as 5 cells, for example, then the user will have trouble capturing patterns from the training image and will not be able to reproduce the patterns in the training image if, for example, there are channels in the training image (i.e., the training image is somewhat complex in nature). Hence, there is a compromise or a trade off to be made between a large conservative number of conditioning data (such as 40) that reproduces the geological patterns in the training image but with increased computation time (e.g., hours) for running the MPS simulation to retrieve training patterns from the search tree and a low number of conditioning data that achieves a relatively faster computation time of the MPS simulation but with a degraded reproduction of the patterns from the training image.

Figure 2:
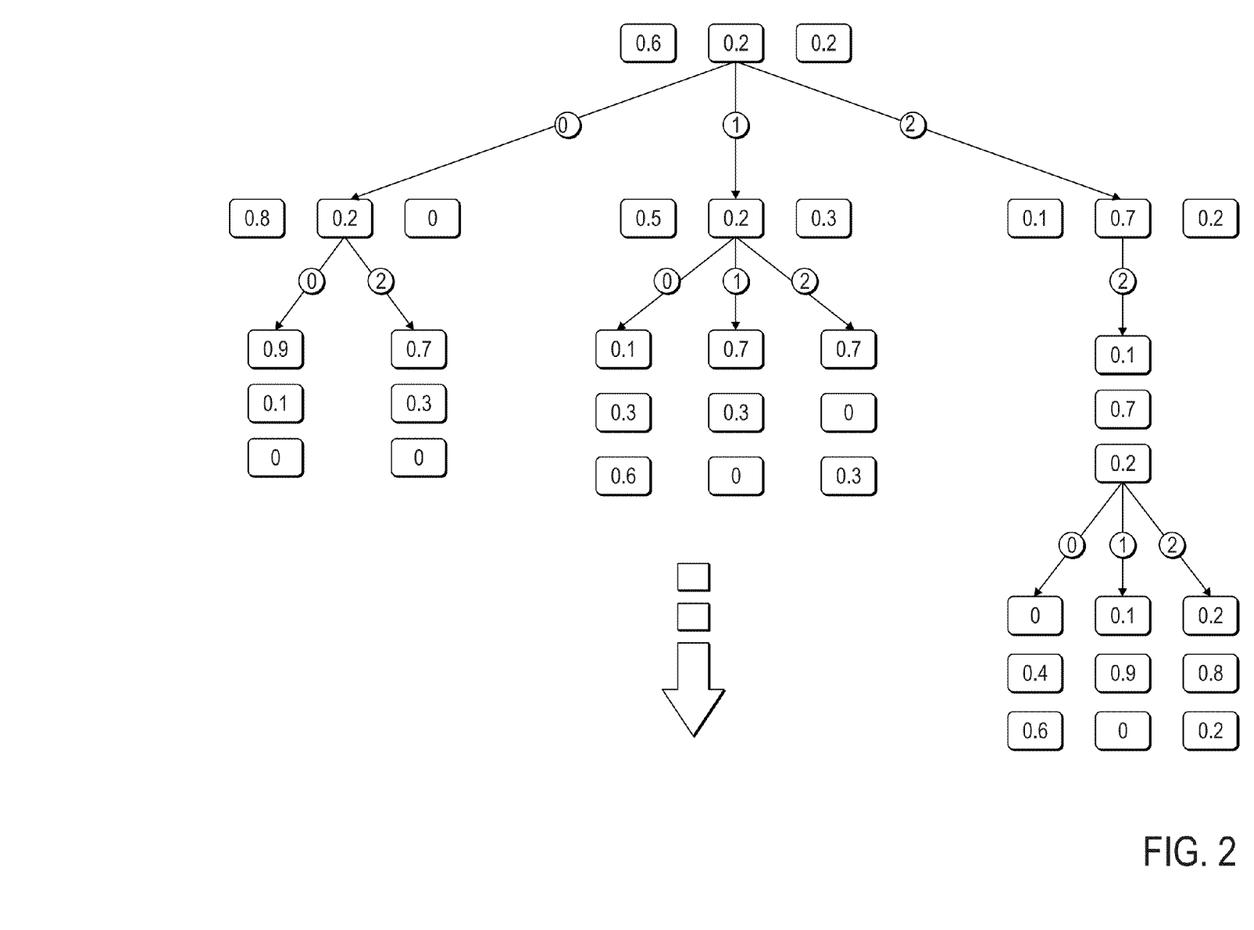
FIG. 2 shows an example of a search tree, according to an embodiment of the present invention.

FIG. 2 shows an example of a search tree, according to an embodiment of the present invention. Search tree 40 is a data structure built from the training image that provides facies probabilities given nearby conditioning data.

Figure 3:
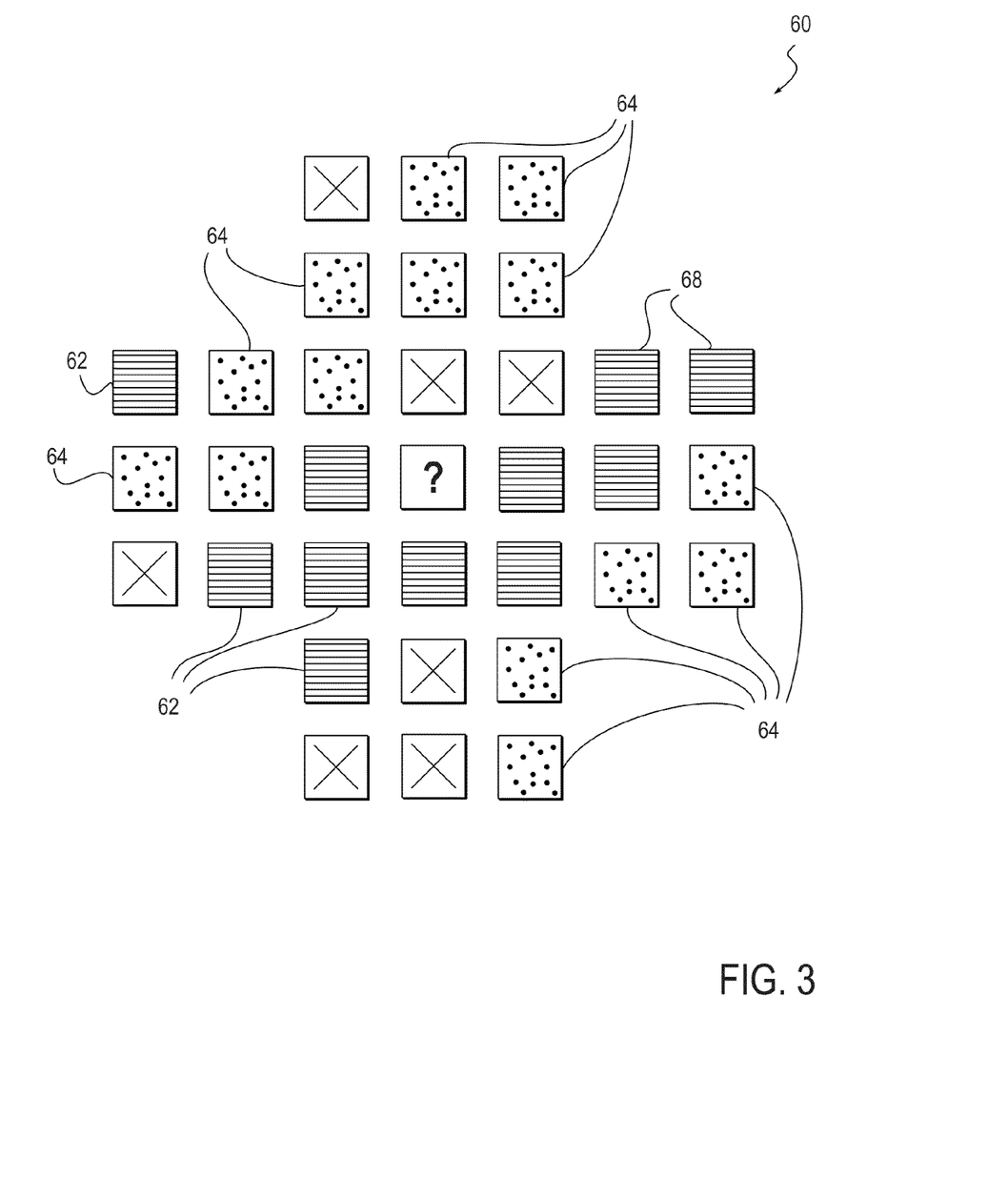
FIG. 3 depicts an example of template and data pattern for this template, according to an embodiment of the present invention.

FIG. 3 depicts an example of a data template, according to an embodiment of the present invention. The geometry of template 60 is provided by the user to define the maximum size and 3D dimensions of the patterns that are stored in the search tree. One main challenge for practitioners is to select a size (e.g., number of cells) of template 60. The larger the template, the more conditioning data are used, the more accurate and precise the inference of the local facies probabilities. However, the larger the template, the longer it also takes to retrieve patterns and facies probabilities from the search tree. Indeed, MPS simulation computation time increases exponentially with the template size. By scanning the training image with template 60, a plurality of patterns is obtained in the search tree. Template 60 also depicts a conditioning pattern with conditioning cells 62 having shale facies and conditioning cells 64 having sand facies. The cells marked with an "X" are of an unknown facies while the cell marked with "?" represents the cell to simulate. Template 60 has 32 cells, i.e., has a size of 32, and contains 25 known conditioning data which are either shale facies or sand facies. The probability of obtaining a shale or sand at the centrally located cell labeled with "?" given conditioning cells 62 and 64 can be computed from the search tree built by scanning the training image using template 60.

To compute the facies probabilities conditional to the conditioning pattern 60, MPS simulation retrieves all the training patterns that match the 25 known conditioning data. In theory, the number of possible patterns that match the conditioning data 62 and 64 may be large. For example, in a case of two facies such as shale and sand, each of the 7 uninformed cells, marked by an "X", can be either in shale or in sand, which produces $2^7=128$ possible patterns. In practice, the number of practical patterns is lower than 128 as some patterns are purely random and they do not have a meaning in terms of geology, thus they are not present in the training image, and are not stored in the search tree.

Currently, users select a conservative, quite large, template size that provides reliable facies probabilities even when MPS simulation computation time can take several hours, for example in the case of complex multi-facies training images. However, this may not be the best strategy in cases where multi-facies training images (i.e., images with more than two facies) are employed and where the geometry of the training images may be complex in nature.

Hence, in one embodiment of the present invention, it is provided a method to optimize the template size while achieving relatively accurate and precise facies probabilities. Hence, in one embodiment, the goal is to find the minimum number of conditioning data that provides accurate and precise facies probabilities.

In one embodiment, the method includes estimating the value of information brought by additional conditioning data when inferring local facies probabilities. The method further includes defining a threshold beyond which additional conditioning data do not significantly modify estimated facies probabilities. To find that threshold, the method computes, for each pattern stored in the training image, corresponding facies probabilities as a function of the number of conditioning data.

Figure 6:
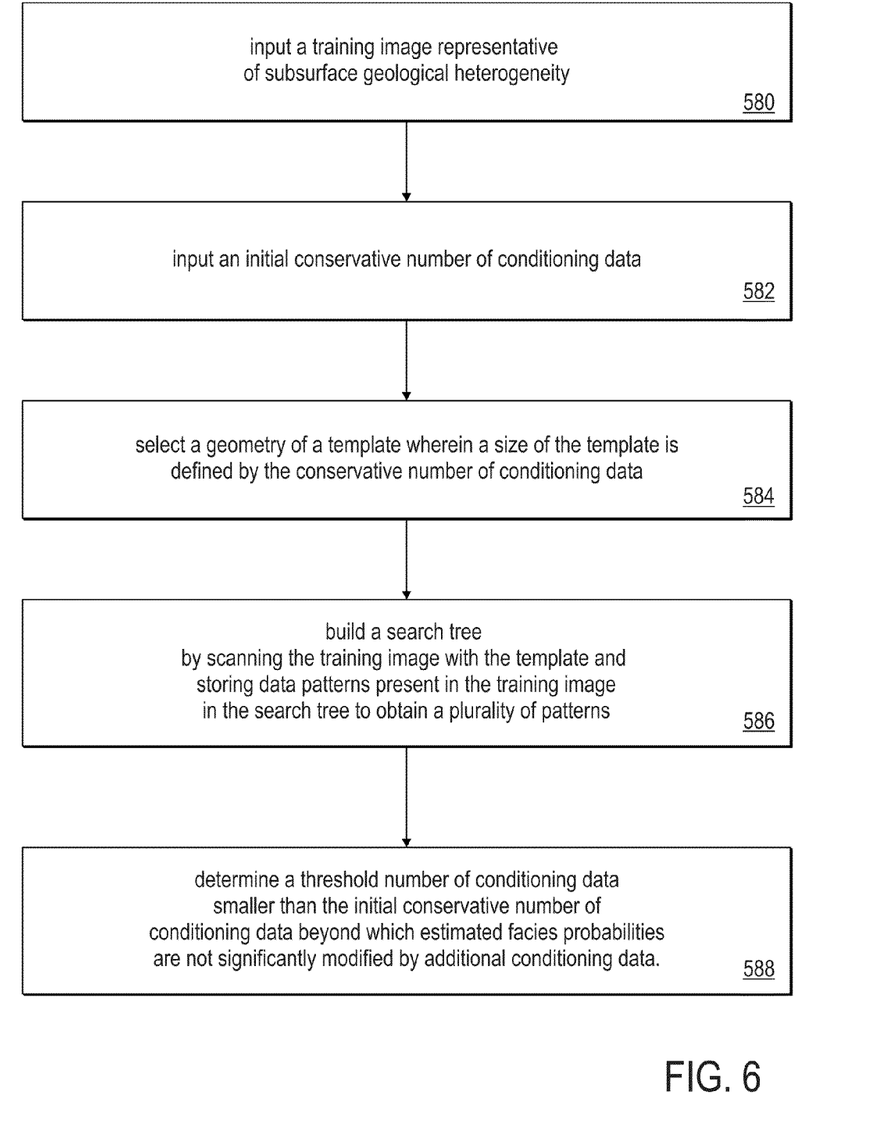
FIG. 6 is a flow chart of a computer implemented method for optimizing the number of conditioning data to use in multiple point statistics simulation, according to an embodiment of the present invention.

FIG. 6 is flow chart of a computer implemented method for optimizing conditioning data templates in multiple point statistics simulation, according to an embodiment of the present invention. The method includes inputting, into the computer, a training image representative of subsurface geological heterogeneity, at S80. The method further includes inputting, into the computer, an initial conservative number of conditioning data, at S82. By conservative number of conditioning data it is meant a number of conditioning data that provides relatively accurate facies probabilities. For example, in one embodiment, the conservative number of conditioning data may be set equal to 40 cells. The method further includes selecting, by the computer, a geometry of a template wherein a size of the template is defined by the conservative number of conditioning data, at S84. The method then builds, using the computer, a search tree by scanning the training image with the template and storing data patterns present in the training image in the search tree to obtain a plurality of patterns, at S86, and further determines, by the computer, a threshold number of conditioning data, smaller than the initial conservative number of conditioning data, beyond which estimated facies probabilities are not significantly modified by additional conditioning data, at S88. For example, if the threshold number of conditioning data is 20 then the estimated facies probability obtained with the number of conditioning data equal to 20 does not substantially change when using a number of conditioning data greater than 20 such as 21, 22, etc. . . . .

In one embodiment, a multiple-grid simulation approach, which includes simulating nested increasingly finer grids, can be used for MPS simulation to capture large-scale features from the training image, in which case some templates need to be defined on coarse grids. For example, initially, MPS may simulate every $8^{th}$ cell (in each x-direction, y-direction, and z-direction) of the original reservoir stratigraphic grid. Then, MPS may simulate, in sequence, every $4^{th}$ cell, every $2^{nd}$ cell, and finally all remaining cells from the original stratigraphic grid. As a result, the template needs to be redefined for each nested grid. Because the template varies from one grid to the other, the method described herein is applied to each nested grid. Indeed, the optimal number of conditioning data also varies from one grid (and corresponding template) to another. Therefore, in one embodiment, when multiple-grid simulation is used, selecting a geometry for the template includes using both informed cells from previously simulated, coarser, grids and uniformed cells from the current, finer, grid to be simulated.

In one embodiment, selecting a geometry includes selecting an elliptical geometry, a circular geometry, or a polygonal geometry, or any other geometry depending on the training image. An example method of determining a geometry is provided in U.S. Patent Application Publication No. US2006/0041410 to Strebelle, the entire contents of which are incorporated herein by reference.

Figure 7:
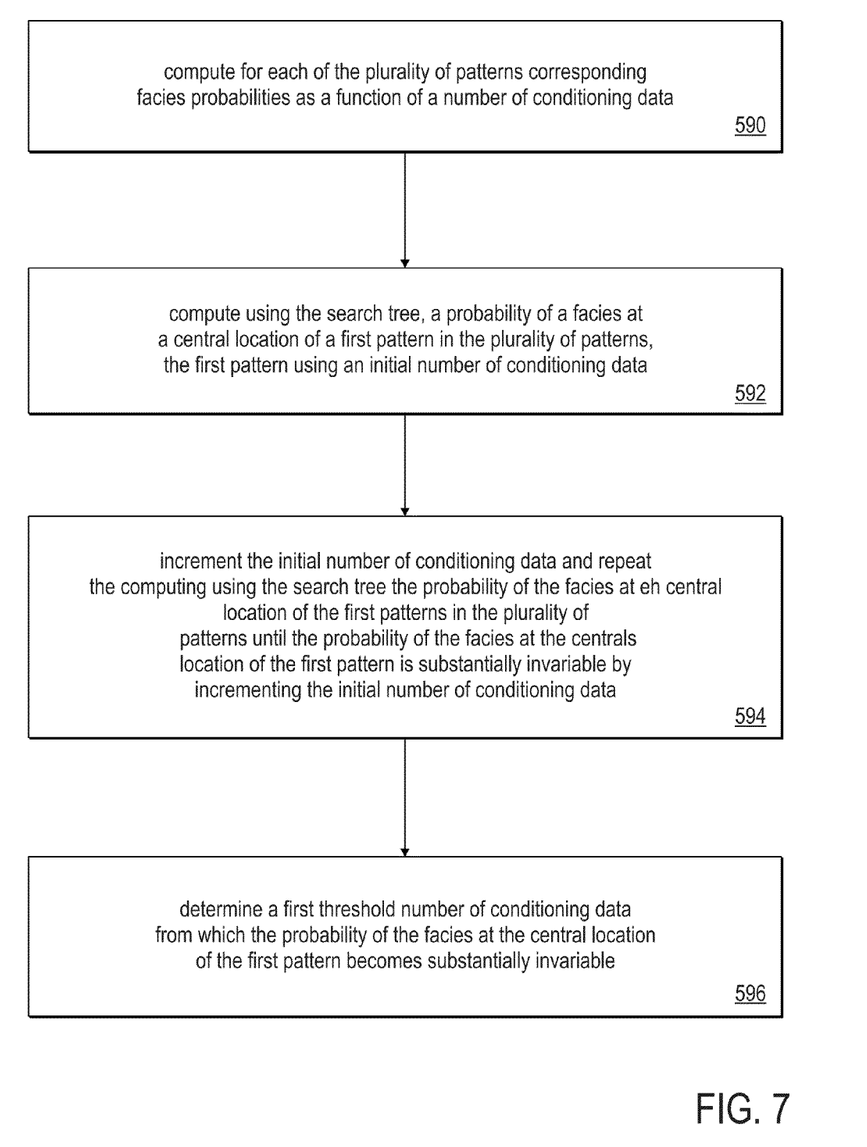
FIG. 7 is a flow chart of a procedure for determining the threshold number of conditioning data provided in FIG. 6.

FIG. 7 is a flow chart of a procedure for determining the threshold number of conditioning data provided at S88 in FIG. 6. In one embodiment, the determining procedure includes computing for each of the plurality of patterns corresponding facies probabilities as a function of a number of conditioning data, at S90, as stated in the above paragraphs. In one embodiment, the determining at S88 includes computing, by the computer, using the search tree, a probability of a facies at a central location of a first pattern in the plurality of patterns, using an initial number of conditioning data, set to 0 by default, at S92. The determining procedure further includes incrementing, by the computer, the initial number of conditioning data and repeating the computing using the search tree the probability of the facies at the central location of the first pattern in the plurality of patterns until the probability of the facies at the central location of the first pattern is substantially invariable by incrementing the initial number of conditioning data, at S94. The determining procedure further includes determining, by the computer, a first threshold number of conditioning data from which the probability of the facies at the central location of the first pattern becomes substantially invariable, at S96.

As will be explained further in the following paragraphs, in one embodiment, repeating the computing using the search tree the probability of the facies at the central location of the first pattern in the plurality of patterns until the probability of the facies at the central location of the first pattern is substantially invariable by incrementing the number of conditioning data includes repeating the computing until the probability of the facies at the central location of the first pattern does not vary more than a set percentage tolerance value (such as, for example, 5%) of the final probability value obtained when using all conditioning data.

Figure 8:
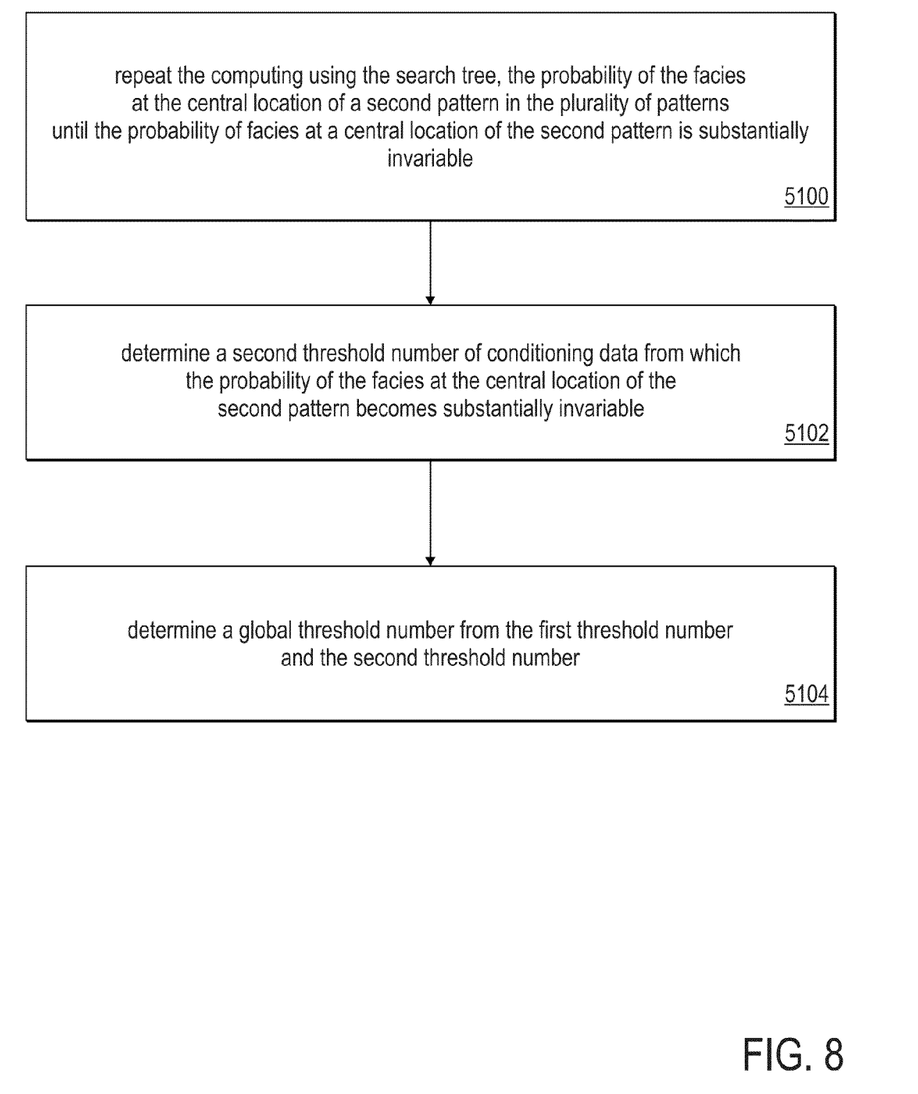
FIG. 8 is a flow diagram of details of a further procedure of determining the threshold number of conditioning data provided in FIG. 6.

FIG. 8 is a flow diagram of details of a further procedure of determining the threshold number of conditioning data provided at S88 in FIG. 6. In one embodiment, the determining procedure includes repeating, by the computer, the computing the probability of the facies at a central location of a second pattern until the probability of facies at the central location of the second pattern is substantially invariable, at S100. The determining procedure further includes determining, by the computer, a second threshold number of conditioning data from which the probability of the facies at the central location of the second pattern becomes substantially invariable, at S102; and determining, by the computer, a global threshold number from the first threshold number and the second threshold number, at S104. As it can be appreciated, in one embodiment, this determining procedure can be repeated for each pattern in the plurality of patterns stored in the search tree. Determining a global threshold will be explained further in detail in the following paragraphs.

FIGS. 4A and 4B provides an example of a table listing various probabilities of finding a facies (e.g., shale or sand, etc.) when using various patterns T1, T2, T3, . . . , T9 stored in the search tree as a function of a number of conditioning data used, according to an embodiment of the present invention. The probabilities within this table are computed from the search tree, which is built from the training image. Although, nine patterns are reported on this table, as it can be appreciated, there can be hundreds or even thousands of patterns in the search tree. For example, in the case of pattern T1 (first pattern), when the number of conditioning data is equal to 0 the probability of finding a given facies is 0.648224. The probability of the given facies increases or decreases with increasing the number of conditioning data. However, after a certain number of input conditioning data (in this case 28), the probability of the given facies does not substantially vary. This implies that the probability for a given facies converges to a probability value (e.g., 0.181818 for the first pattern) after a threshold of number of conditioning data (28). This implies, in this case, that using a number of conditioning data greater than 28 is a waste of computation resources and would simply increase the computation time without providing additional precision in the estimation of facies probability. Similarly, analysis can also be made in the case of another pattern T2 (a second pattern). In this case, a convergence of facies probability is obtained also after the number of conditioning data reaches 28 if the percentage tolerance is set to, for example, 5%.

Among the nine patterns (first pattern, second pattern, etc) in the table shown in FIGS. 4A and 4B, if the facies probability convergence tolerance is set to +/−5%, a convergence of the facies probabilities is obtained after a threshold number of 28 conditioning data for T1, T2, T3, T4, T5, T6, and T9, and a threshold number of 25 conditioning data for T7 and T8. The global solution includes estimating a threshold number of conditioning data that could be used for all patterns. That global threshold number can be defined as a percentile of the threshold numbers computed over all the patterns stored in the search tree, e.g. the 90-percentile. In the example discussed herein, the 90-percentile would correspond to 28 conditioning data, which means that for at least 90% of the patterns stored in the search tree, the corresponding facies probabilities converge (within a given tolerance set to +/−5% in this case) after the number of conditioning data reaches 28. Reducing the template size or number of conditioning data from 40 to about 28 results in reducing the computing time for performing the MPS simulation.

The global solution defines the optimal template size as the number of conditioning data that allows inferring facies probabilities within a given tolerance (e.g., 5%) for at least a given proportion (e.g., 90%) of the patterns stored in the search tree. In other words, determining a global threshold number comprises defining the threshold number of conditioning data at which point the facies probabilities estimated for a percentage cut-off number (e.g., 90%) of all the patterns in the tree are substantially invariable.

The global optimal template size is used during MPS simulation as the number of conditioning data to use for retrieving local facies probabilities. The global optimal number varies depending on the complexity of the training image, but it is typically much lower than the arbitrary conservative template size (e.g., 40) initially set by the user. This allows reducing the total simulation run time by several orders of magnitude.

In another embodiment, instead of using a global solution, a local solution can be implemented in which the threshold number of conditioning data computed for each pattern is recorded, and used during the MPS simulation to determine the number of conditioning data used for retrieving local facies probabilities depending on the pattern formed by the conditioning data. That is, instead of one threshold (one optimal number of conditioning data) per template, it may be possible to have multiple thresholds per one template depending on the patterns. For example, one optimal number of conditioning data may be determined for patterns starting with a sand value at the first location of the template, and another optimal number of conditioning data may be determined for the patterns starting with a shale value at that first location.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 5:
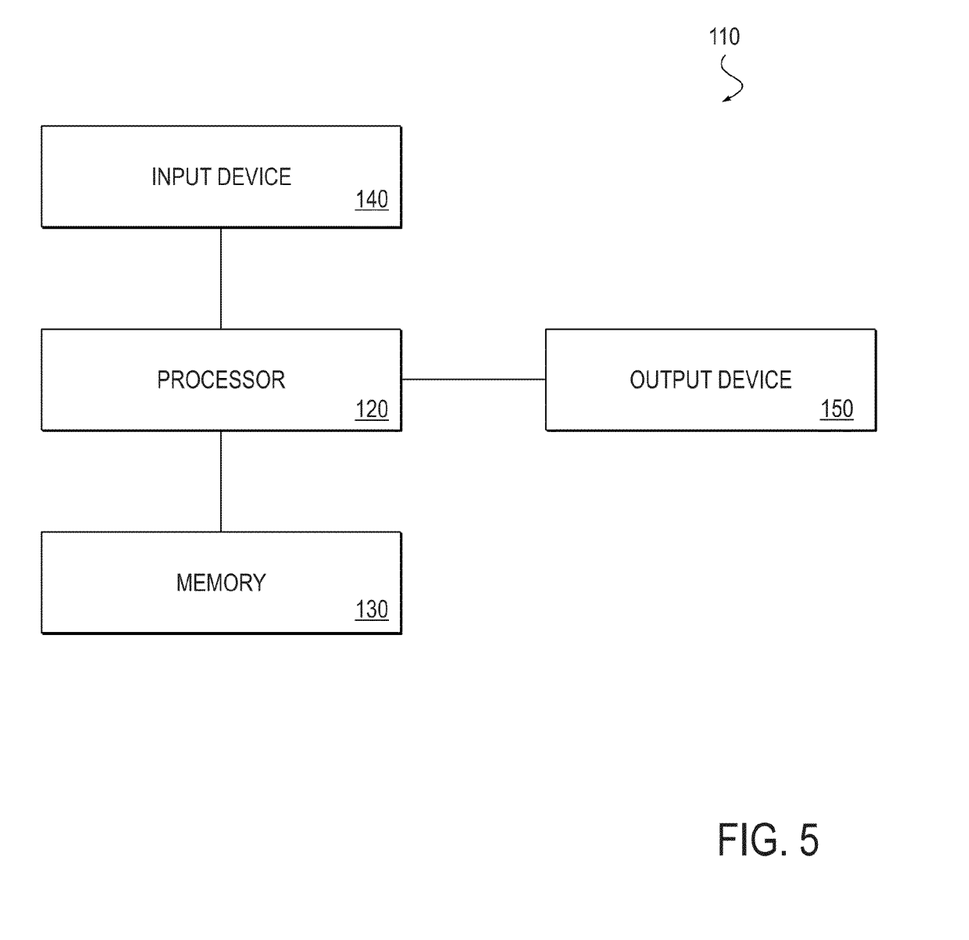
FIG. 5 is a schematic diagram representing a computer system for implementing a method for optimizing the number of conditioning data to use in multiple point statistics simulation, according to an embodiment of the present invention.

FIG. 5 is a schematic diagram representing a computer system 100 for implementing the method, according to an embodiment of the present invention. As shown in FIG. 2, computer system 110 comprises a processor (e.g., one or more processors) 120 and a memory 130 in communication with the processor 120. The computer system 110 may further include an input device 140 for inputting data (such as keyboard, a mouse or the like) and an output device 150 such as a display device for displaying results of the computation.

As can be appreciated from the above description, the computer readable memory 130 can be configured to store input data comprising a training image representative of subsurface geological heterogeneity; and an initial conservative number of conditioning data. The processor is configured to read input data and select a geometry of a template wherein a size of the template is defined by the conservative number of conditioning data; build a search tree using the template by scanning the training image with the template and storing data patterns present in the training image in the search tree to obtain a plurality of patterns; and determine a threshold number of conditioning data smaller than the initial conservative number of conditioning data beyond which estimated facies probabilities are not significantly modified by additional number of conditioning data.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A computer implemented method for optimizing the number of conditioning data to use in multiple point statistics simulation, the method comprising:
    inputting, into the computer, a training image representative of subsurface geological heterogeneity;
    inputting, into the computer, an initial conservative number of conditioning data;
    selecting, by the computer, a geometry of a template wherein a size of the template is defined by the initial conservative number of conditioning data;
    building, using the computer, a search tree by scanning the training image with the template and storing data patterns present in the training image in the search tree to obtain a plurality of patterns; and
    determining, by the computer, a threshold number of conditioning data, smaller than the initial conservative number of conditioning data, beyond which estimated facies probabilities are not significantly modified by additional conditioning data, wherein the determining comprises:
        computing, by the computer, using the search tree, a probability of a facies at a central location of a first pattern in the plurality of patterns, using an initial number of conditioning data;
        incrementing, by the computer, the initial number of conditioning data and repeating the computing using the search tree the probability of the facies at the central location of the first pattern in the plurality of patterns until the probability of the facies at the central location of the first pattern is substantially invariable by incrementing the initial number of conditioning data; and
        determining, by the computer, a first threshold number of conditioning data from which the probability of the facies at the central location of the first pattern becomes substantially invariable.

2. The method according to claim 1, wherein the determining, by the computer, comprises computing for each of the plurality of patterns corresponding facies probabilities as a function of a number of conditioning data equal to or smaller than the initial conservative number of conditioning data.

3. The method according to claim 1, wherein repeating the computing using the search tree the probability of the facies at the central location of the first pattern in the plurality of patterns until the probability of the facies at the central location of the first pattern is substantially invariable by incrementing the number of conditioning data comprises repeating the computing until the probability of the facies at the central location of the first pattern does not vary more than a set percentage tolerance value of the facies probability value obtained when using all conditioning data.

4. The method according to claim 1, wherein the determining further comprises:
    repeating, by the computer, the computing using the search tree the probability of the facies at the central location of a second pattern in the plurality of patterns until the probability of facies at a central location of the second pattern is substantially invariable;
    determining, by the computer, a second threshold number of conditioning data from which the probability of the facies at the central location of the pattern becomes substantially invariable; and
    determining, by the computer, a global threshold number from the first threshold number and the second threshold number.

5. The method according to claim 4, wherein determining a global threshold number comprises selecting a percentage cut-off number such that the global threshold number is computed as the number of conditioning data beyond which facies probabilities become substantially invariable for at least that percentage cut-off number of the patterns stored in the search tree.

6. The method according to claim 1, wherein selecting a geometry of the initial template comprises using cells from a coarse grid when a multiple-grid simulation approach is used in a multiple point statistics simulation.

7. The method according to claim 1, wherein selecting a geometry of the initial template comprises optimizing the number of informed cells within a grid when a multiple-grid simulation approach is used in a multiple point statistics simulation.

8. The method according to claim 1, wherein selecting a geometry of the initial template comprises selecting an elliptical geometry, a circular geometry, or a polygonal geometry.

9. The method according to claim 1, further comprising performing a multiple point simulation by determining facies probabilities of each facies within the training image using each of a plurality of data patterns, the plurality of data patterns having a size defined by the threshold number of conditioning data.

10. A computer implemented method for optimizing conditioning data templates in multiple point statistics simulation, the method comprising:
    inputting, into the computer, a training image representative of subsurface geological heterogeneity; inputting, into the computer, an initial conservative number of conditioning data;
    selecting, by the computer, a geometry of a template wherein a size of the template is defined by the initial conservative number of conditioning data;
    building, using the computer, a search tree by scanning the training image with the template and storing data patterns present in the training image in the search tree to obtain a plurality of patterns
    building, using the computer, a pattern table using the template by scanning the training image with the template and storing data patterns from the search tree in the pattern table; and
    computing, by the computer, for each of the plurality of patterns corresponding facies probabilities as a function of a number of conditioning data, the number of conditioning data being equal to or smaller than the initial conservative number of conditioning data, wherein the computing comprises:
        computing, by the computer, using the search tree, a probability of a facies at a central location of a first pattern in the plurality of patterns, using an initial number of conditioning data;
        incrementing, by the computer, the initial number of conditioning data and repeating the computing using the search tree the probability of the facies at the central location of the first pattern in the plurality of patterns until the probability of the facies at the central location of the first pattern is substantially invariable by incrementing the initial number of conditioning data; and
        determining, by the computer, a first threshold number of conditioning data from which the probability of the facies at the central location of the first pattern becomes substantially invariable.

11. The method according to claim 10, further comprising determining, by the computer, a threshold number of conditioning data, smaller than the initial conservative number of conditioning data, beyond which the computed facies probabilities are not significantly modified by additional conditioning data.

12. A system for optimizing conditioning data templates in multiple point statistics simulation, comprising: a computer readable memory configured to store input data comprising:
    a training image representative of subsurface geological heterogeneity; and an initial conservative number of conditioning data;
    and a computer processor in communication with the computer readable memory, the computer processor being configured to:
    read the input data;
    select a geometry of a template wherein a size of the template is defined by the initial conservative number of conditioning data;
    build a search tree using the template by scanning the training image with the template and storing data patterns present in the training image in the search tree to obtain a plurality of patterns;
    determine a threshold number of conditioning data, smaller than the initial conservative number of conditioning data, beyond which estimated facies probabilities are not significantly modified by additional conditioning data;
    compute, using the search tree, a probability of a facies at a central location of a first pattern in the plurality of patterns, the first pattern using an initial number of conditioning data;
    increment the initial number of conditioning data and repeat the computing using the search tree the probability of the facies at the central location of the first pattern in the plurality of patterns until the probability of the facies at the central location of the first pattern is substantially invariable by incrementing the initial number of conditioning data; and
    determine a first threshold number of conditioning data from which the probability of the facies at the central location of the first pattern becomes substantially invariable.

13. The system according to claim 12, the processor is configured to compute for each of the plurality of patterns corresponding facies probabilities as a function of a number of conditioning data equal to or smaller than the initial conservative number of conditioning data.

14. The system according to claim 12, wherein the processor is configured to repeat the computing until the probability of the facies at the central location of the first pattern does not vary more than a set percentage tolerance value of a the facies probability value obtained using all conditioning data.

15. The system according to claim 12, wherein the processor is configured to: repeat the computing of the probability of the facies at the central location of the pattern until the probability of facies at a central location of a second pattern in the plurality of patterns is substantially invariable; determine a second threshold number of conditioning data from which the probability of the facies at the central location of the second pattern becomes substantially invariable; and determine a global threshold number from all the first and second threshold numbers.

16. The system according to claim 15, wherein the processor is configured to select a percentage cut-off number such that the global threshold number is computed as the number of conditioning data beyond which facies probabilities become substantially invariable for at least that percentage cut-off number of the patterns stored in the search tree.

* * * * *